Figure 1:
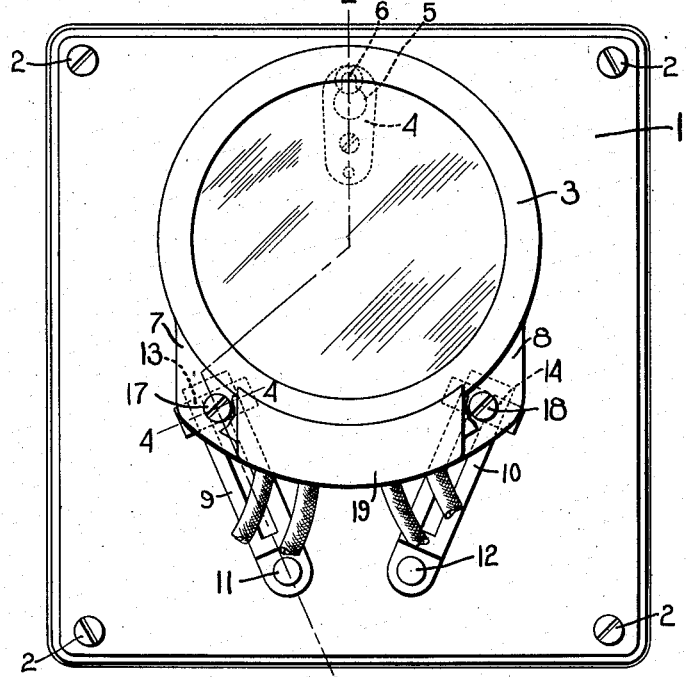

F. E. CHASE.
METER SUPPORT.
APPLICATION FILED MAY 27, 1914.

1,134,257.

Patented Apr. 6, 1915.

Witnesses.
J. Morrill Fuller
William E. Gagen

Inventor.
Frank E. Chase
by Heard Smith & Tennant
Att'y's

UNITED STATES PATENT OFFICE.

FRANK E. CHASE, OF DANVERS, MASSACHUSETTS.

METER-SUPPORT.

1,134,257.  Specification of Letters Patent.  Patented Apr. 6, 1915.

Application filed May 27, 1914. Serial No. 841,356.

*To all whom it may concern:*

Be it known that I, FRANK E. CHASE, a citizen of the United States, residing at Danvers, county of Essex, State of Massachusetts, have invented an Improvement in Meter-Supports, of which the following description, in connection with the accompanying drawing, is a specification, like characters on the drawing representing like parts.

This invention relates to a support for meters adjustable to suit meters of different types and of different sizes. Corporations supplying electric current to the public for light and power usually provide meters located on the premises of the consumers to determine the amount of power used. The equipment especially the wiring is permanent in character and is used for a long time without substantial alteration. Because of the permanent character of the wiring and equipment and on account of the improvements and changes in meters and the wearing out of meters it usually happens that the meters are replaced several times during the life of the equipment and usually by meters of a different size or style. The meters are usually provided with a fastening device positioned at the top of the meter adapted to hook over the head of a screw and with two spaced holes through which screws are passed and secured in the support but no uniformity exists in the positioning of these holes relative to the fastening device. It is necessary, therefore to drill new holes each time that a new meter is installed. This involves considerable trouble and inconvenience for the reason that the support to which the meter is secured is usually made of hard fire-proof material such as iron or composition. It is also necessary when installing meters initially to adapt the support to the meter and since different types of meters are installed under different conditions of service, it is not possible when supports of usual design are used to carry one standard support which may be used with the several types of meters.

Accordingly this invention has for an object to provide a support which will be adaptable to receive meters of different types without the necessity of drilling new holes or otherwise mutilating the support. In accordance with my invention, I provide a support which may be made of any suitable material having one fixed fastening device to provide a fixed point of attachment for the meter and having two adjustable fastening devices to provide adjustable points of attachment.

The nature and objects of the invention will more fully appear from the following specification and accompanying drawing, and the novel features will be particularly pointed out in the claims.

Figure 2:
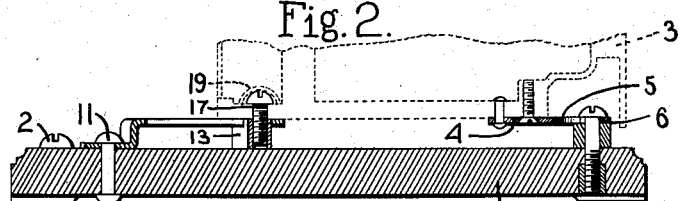
Figure 3:
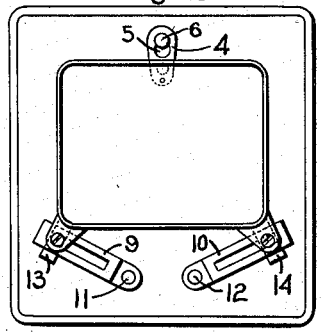
Figure 4:

Referring to the drawing in which I have illustrated a selected embodiment of my invention; Figure 1 is a plan view of the device, a meter being illustrated as attached thereto; Fig. 2 is a sectional view taken on the line 2—2 Fig. 1; Fig. 3 is a plan view of the device showing another type of meter attached thereto, and Fig. 4 is a sectional view of the slidable fastening member taken on the line 4—4 Fig. 1.

Referring to the drawing in detail, 1 designates the base which may be conveniently stamped from sheet metal or may be made of other fire-resisting material. This base may be secured to a wall or other fixed support by any convenient means as by screws 2 and is provided with holes at its four corners for this purpose. I have illustrated in Fig. 1 a meter 3 as secured to the support. The meter is provided as usual with a plate 4, secured to its back and having a key-hole slot 5 therein to provide means whereby the meter may be fixedly attached to a support. I provide a screw 6, secured in the base over the head of which, the plate 4 may be placed, thus providing a fixed point of attachment for the meter. In practice the base is usually fixed to a wall and this screw and plate provides a simple and convenient means whereby the meter may be hung upon the support, the meter thus being held in position while the other fastening devices are attached.

Meters are almost universally provided with fastening devices, the equivalent of the plate shown at 4 in Fig. 1 and are also provided with lugs having screw holes such as those indicated at 7 and 8. By my invention I provide adjustable fastening devices or adapters by which the meter may be secured to the base by screws extending through these holes but without the necessity for drilling holes in the base to receive the screws. In the structure illustrated the adjustable fastening devices comprise links 9, 10 permanently pivoted to the base as by rivets or screws 11, 12 and therefore transversely adjustable and blocks 13, 14 slidable on the links. The blocks are drilled and tapped as indicated at 15 to receive screws 17, 18 extending through the usual holes in lugs 7, 8 on the meter. The blocks may be slidably connected to the links in any suitable manner. I have illustrated a preferred form of block in Fig. 4 the link being slotted and the block fitting around the link and in the slot. By swinging the links and adjusting the blocks to the proper position thereon, the threaded holes in the blocks may be brought directly beneath the screw holes in the lugs of the meter and the screws may readily be inserted. A protecting plate 19 is provided as usual, which fits over the points of attachment for the conductors and also fits over the heads of the screws fastening the meter to the links. This plate is of the form usually provided with meters of all descriptions to prevent tampering with the meter and is usually sealed in place so that the meter cannot be tampered with without mutilating the seal.

In Fig. 3 I have illustrated a different form of meter as attached to the device merely to indicate the adaptability of the device. It will be seen I have thus provided an adjustable support by which meters of various types may be readily attached without permanent mutilation of the support and without the drilling of new holes for meters of different types or of different sizes.

The device is simple and can be cheaply manufactured the cost not being materially more than that of the support usually provided to satisfy the requirement of the fire regulations.

Having thus described my invention what I claim as new and desire to secure by Letters Patent is:

1. An adjustable support for meters comprising a base, a fastening device thereon to provide a fixed point of attachment for a meter, and a pair of links pivoted to said base at points spaced from said fastening device and having auxiliary fastening devices adjustable longitudinally thereof to provide adjustable points of attachment for the meter.

2. An adjustable support for meters comprising a base, a fastening device thereon providing a fixed point of attachment for a meter, and a pair of adjustable fastening devices thereon spaced from said first mentioned fastening device comprising transversely adjustable members having means providing longitudinally adjustable attachment for the meter.

3. A support for meters comprising a base, a projecting fastening device thereon to provide a fixed point of attachment for a meter, a pair of slotted links permanently and pivotedly connected to said base and blocks slidably mounted on said links and having holes tapped to receive screws to provide adjustable points of attachment for the meter.

In testimony whereof, I have signed my name to this specification, in the presence of two subscribing witnesses.

FRANK E. CHASE.

Witnesses:
 MAURICE B. LANDERS,
 J. MORRILL FULLER.